United States Patent [19]

Gibbs et al.

[11] Patent Number: 4,493,138

[45] Date of Patent: Jan. 15, 1985

[54] VAPOR COOLED ELECTRICAL INDUCTIVE APPARATUS

[75] Inventors: Richard D. Gibbs, Hermitage; Roger C. Johnson, Sharpsville, both of Pa.

[73] Assignee: Westinghouse Electric Corp., Pittsburgh, Pa.

[21] Appl. No.: 497,214

[22] Filed: May 25, 1983

Related U.S. Application Data

[62] Division of Ser. No. 154,152, May 28, 1980, abandoned.

[51] Int. Cl.[3] .......... B23Q 15/00

[52] U.S. Cl. .......... 29/33 Q; 409/131

[58] Field of Search .......... 29/33 Q, 33 F, 33 R, 29/33 S; 409/133, 131, 132, 186, 188, 193, 195, 147

[56] References Cited

U.S. PATENT DOCUMENTS

| | | | |
|---|---|---|---|
| 1,930,219 | 10/1933 | Zimber | 29/33 F X |
| 1,930,446 | 10/1933 | Weybrecht et al. | 29/33 F X |
| 1,954,009 | 4/1934 | Kotchl | 29/33 F X |

FOREIGN PATENT DOCUMENTS

| | | | |
|---|---|---|---|
| 2847452 | 5/1980 | Fed. Rep. of Germany | 409/133 |
| 916239 | 3/1982 | U.S.S.R. | 409/133 |

*Primary Examiner*—William R. Briggs

*Attorney, Agent, or Firm*—L. P. Johns

[57] ABSTRACT

Vapor cooled induction apparatus having a winding with predetermined surface irregularities on the turn surfaces of the winding to provide spaces to permit a cooling/insulating vaporizable liquid dielectric to flow between the turn surfaces of the winding to enable a film of the insulating cooling detection to be deposited on the surface area of the winding. The surface irregularities may be transverse grooves disposed at predetermined intervals in at least one surface of an elongated metallic conductor used to form the winding or they may be bosses of insulation disposed on a predetermined spacing on at least one surface of the elongated metallic conductor. Also disclosed are a method and apparatus for forming precisely spaced grooves in the surface of a continuously moving elongated conductor and thereafter insulating the grooved conductor with a uniform, solid, homogeneous coating of electrical insulation.

4 Claims, 10 Drawing Figures

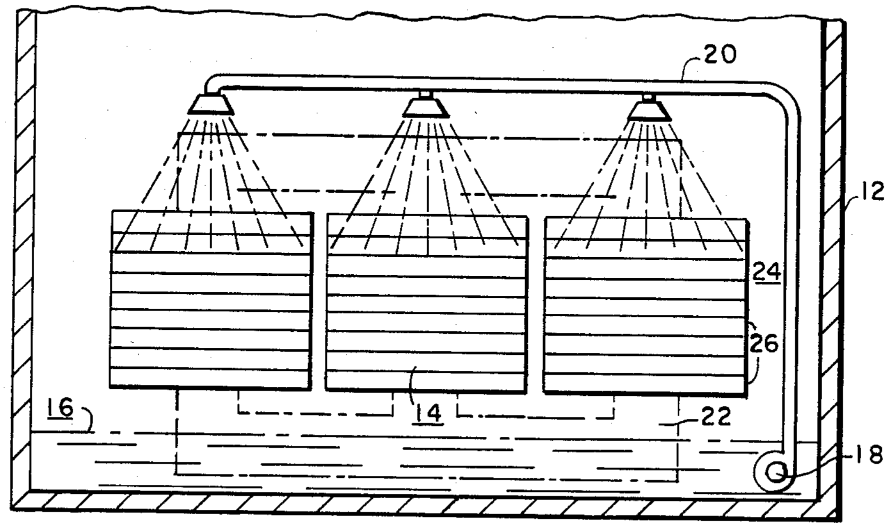
FIG 1
FIG 2
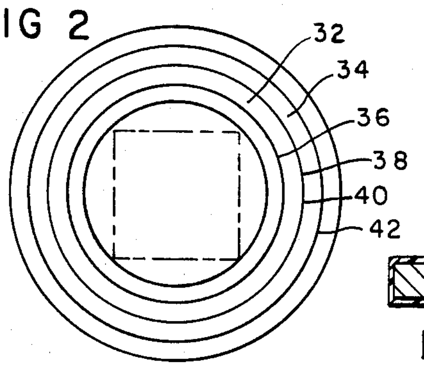
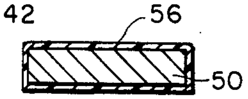
FIG 5
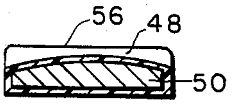
FIG 6
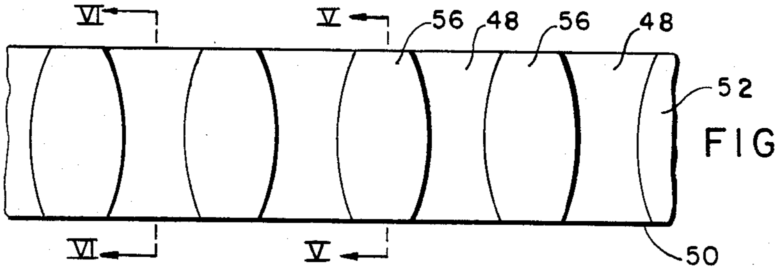
FIG 3
FIG 4

VAPOR COOLED ELECTRICAL INDUCTIVE APPARATUS

This application is a division of application Ser. No. 154,152, filed May 28, 1980, abandoned.

BACKGROUND OF THE INVENTION

1. Field of the Invention

This invention relates in general to electrical inductive apparatus, such as transformers, and more particularly to vapor-cooled inductive apparatus.

2. Description of the Prior Art

The combination of gas/vapor medium has proven to be a viable alternative to oil as a dielectric cooling medium to be used in transformers, as well as other electrical apparatus. The limiting factor regarding widespread use has been of an economic nature, i.e., oil is but a fraction of the cost of known vapor alternatives.

A recent advance in the transformer industry that has helped reduce the amount of expensive liquid dielectric necessary for a gas/vapor transformer has been the development of powder coated insulated wire. The development of this insulation technique has enabled the insulation requirements of winding conductors to be reduced to several mils thickness thereby allowing reduction in sizes of the windings and corresponding size reduction of the transformer and required vapor cooling liquid dielectric medium. However, this method of insulation presents a problem because the highly uniform surface covering, normally a desirable by-product of the new insulation technique, does not allow the liquid dielectric to pass between adjacent turns of a winding formed of wire so insulated.

Prior art techniques of providing passages with suitable spacers between the turns of the windings, used in oil filled transformers, are not suitable in vapor-cooled transformers using powder coated insulation for several reasons. First, the difference between the dielectric constants of a gas or vapor media and conventional oil barriers greatly changes the stress grading so that oil structures cannot be effectively used. Second, the passages provided by solid spacers require a larger radial build on the winding, therefore requiring a larger amount of expensive vaporizable liquid dielectric and an increased size in the transformer itself. Third, inserting spacers between the turns of the winding reduces the strength of the winding to withstand short circuit forces.

Accordingly, it would be desirable to have a powder coated insulated coil with integral passages to provide adequate paths for the liquid dielectric to disperse over and flow between the surfaces of an induction winding without the use of solid spacers.

SUMMARY OF THE INVENTION

Briefly, the present invention is new and improved vapor-cooled electrical inductive apparatus having a winding with predetermined surface irregularities on the turn surfaces of the winding to provide spaces between certain adjacent portions of the turn surfaces to permit a cooling/insulating vaporizable liquid dielectric to flow therebetween. The surface irregularities may take the form of transverse grooves or bosses of insulation disposed at predetermined intervals in one of the sides of an elongated metallic conductor.

Also disclosed in the present invention is a method and apparatus for forming precisely spaced grooves and measuring the distance between the grooves so formed in the surface of a continuously moving elongated metallic conductor. The method includes the step of insulating the grooved conductor to produce a homogeneous solid insulated conductor having grooves at a predetermined spacing cut into at least one surface.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which:

FIG. 1 is a fragmentary elevational view of vapor-cooled electrical apparatus which may be constructed according to the teachings of the invention;

FIG. 2 is a top view of a typical layer of a coil of the apparatus of FIG. 1;

FIG. 3 is a top view of a solid insulated grooved conductor according to the teachings of the invention;

FIG. 4 is a front view of the conductor shown in FIG. 3;

FIG. 5 is a cross-sectional view of the conductor as shown in FIG. 3 taken between arrows 5—5;

FIG. 6 is a cross-sectional view of the conductor as shown in FIG. 3 taken between arrows 6—6;

DESCRIPTION OF THE PREFERRED EMBODIMENTS

Figure 7:
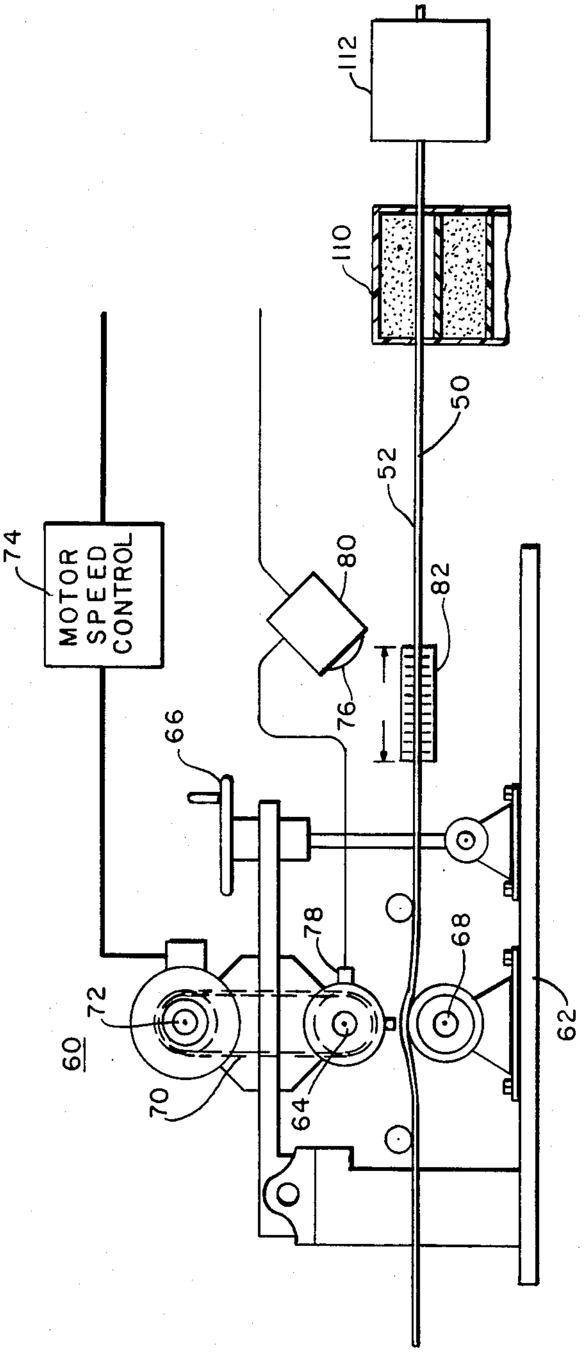
FIG. 7 is a diagrammatic view in elevation of apparatus for forming precisely-spaced grooves in the surface of a continuously-moving elongated metallic conductor and insulating said grooved conductor according to the teachings of the invention.

Referring now to the drawings and FIG. 1 in particular, there is shown a diagrammatic representation of a three-phase power transformer 10 which is of the gas/-vapor type. Transformer 10 includes a tank or casing 12 having a magnetic core winding assembly 14 disclosed therein, and liquid dielectric 16 such as $C_2CL_4$, $C_8F_{16}O$, or the like, which is vaporizable within the normal operating temperature range of the magnetic core winding assembly 14. The liquid dielectric 16 is distributed over the magnetic core winding assembly 14 by any suitable means, such as via pump 18 and piping means 20. In addition to the vapors of the liquid dielectric 16, tank 12 may include a non-condensible gas, such as $SF_6$, to provide insulation during start-up of the transformer 10.

Core winding assembly 14 includes magnetic core 22 and three sets of windings 24, one for each phase of the power source (not shown) transformer 10 would be connected to. Windings 24 include a plurality of axially adjacent layers such as layer 26. As shown in FIG. 2, each layer such as layer 26 has a plurality of radially adjacent turns, such as turns 32 and 34 having turn surfaces such as turn surfaces 36, 38, 40 and 42 in contact with one another.

In the prior art, these turns were insulated by wrapping with a cellulose paper. The wrapped paper turns had enough irregularities between the turn surfaces to permit the liquid dielectric to flow therebetween and thereby spread a uniform film over the winding which would evaporate and cool the winding. Recent powder coating techniques have developed uniform solid insulation depositions of 2 to 4 mils thickness deposited on the surface of the winding conductors, thereby enabling the coils to be reduced in radial build. However, when the conductor was insulated with the new powder coated solid type insulation, the turn surfaces fit flush to one another such that the liquid dielectric did not have paths to pass through the winding.

It was essential that the cooling/insulating liquid dielectric be able to flow uniformly throughout the interior of the winding depositing a film of liquid dielectric over the turn surfaces of the coil for subsequent vaporization, cooling, and insulating functions. Two different solutions were considered to alleviate this problem. The first was the use of solid insulating spacers to form coolant ducts throughout the winding similar to the oil ducts used in oil immersed transformers. This solution proved unsatisfactory for several reasons. The spacers increase the radial build of the winding, negating the space advantage provided by the powder coated insulation. Also, the solid spacers reduce the high strength of the coil necessary to withstand short circuit forces. Most important, however, was that differences between the dielectric constants of the gas or vapor media and conventional oil barriers (solid insulation spacers) greatly change the stress grading. The dielectric constant of a gas or vapor is very close to one (1) while the dielectric constant of conventional solid insulating materials is approximately four (4) to six (6). A high dielectric constant material which penetrates a non-uniform or highly stressed dielectric field present in a gaseous dielectric, can cause very low corona inception voltages and low dielectric breakdowns, compared with no solid spacers. Thus, certain desirable and conventional arrangements of coil and winding supporting spacers, such as those used in liquid filled apparatus, are denied use in gas/vapor applications because of high dielectric constant spacers penetrating non-uniform fields in an insulating dielectric having a dielectric constant of near 1.

The simplest and most desirable solution was that of using no spacers if possible, i.e. to provide the powder coated insulated surfaces with some type of irregularities so as to provide liquid coolant circulation passages throughout the winding. The problem now was how to provide irregularities in a surface that, due to the powder coating insulating process, is characterized by its uniformity. Two methods were employed to produce the irregularities in an elongated conductor having a uniform covering of a solid homogeneous coating of electrical insulation.

The first method is illustrated in FIGS. 3 through 6 wherein transverse indentations in the form of evenly-spaced grooves such as grooves 48 were placed in the surface of the conductor prior to the powder coating deposition of insulation. The grooves 48 have a width of 250 mils and were disposed in one of the surfaces 52 of one of the sides of rectangular configured elongated conductor 50 having the larger cross-sectional dimension. Grooves 48 were formed to a depth of 6 mils and after the powder coating deposition of insulation step retained the 6 mil depth. The depth selected for the grooves 48 is subject to the parameter that the ratio of the depth of the grooves 48 to the cross sectional area of the metallic conductor 50 must be selected to provide the conductor 50 with the predetermined current capacity necessary for operation of the contemplated winding. When the insulated conductor 50 with the grooves so formed was wound around a coil form to construct a winding similar to windings 24, the liquid dielectric flowed in the passages formed by the grooves very well. By controlling the spacing, the depth and the angle (although FIGS. 3 and 4 show grooves 48 disposed at 90° transverse to the longitudinal length of conductor 50, the grooves may be disposed in a surface of the conductor at any predetermined transverse angle) of the grooves so formed in the conductor 50, it is possible to control the rate of flow of the liquid dielectric.

Note that grooves 48 illustrated in FIGS. 3 and 4 have an hourglass funnel configuration. Although this configuration is not necessary in order to practice the invention, i.e., straight grooves perform satisfactorily, they illustrate a preferred embodiment of the invention. The hourglass funnel-shaped grooves 48 provide hourglass funnel-shaped ducts between certain adjacent portions of the turn surfaces 52 when conductor 50 is wrapped into a winding, thereby increasing the flow of liquid dielectric within the hourglass funnel-shaped ducts while providing sufficient surface area on the surface 52 of conductor 50, by way of the barrel-shaped spaces 56 between the hour-glass funnel-shaped grooves, to fully withstand compressive forces due to the tight wrapping of the conductor when it is wound into a winding. FIGS. 5 and 6, cross-sectional views of the barrel-shaped spaces 56 and the hourglass-shaped grooves 48 respectively, show in elevation the unique configuration of these items.

Although both the straight and hourglass grooves have been described, the invention is not limited to any particular shape of the groove, but rather emcompasses all groove configurations. The shape of the groove, the angle of the groove and the dimensions of the groove as well as the shape and dimensions of the conductor, all may be varied without departing from the teachings of the invention.

Apparatus for forming precisely-spaced grooves in the surface of a continuously moving elongated metallic conductor such as conductor 50 is shown schematically in FIG. 7. Grooving apparatus 60 includes frame 62 supporting a grooving means 64, such as the router cutter apparatus shown, for grooving the surface of a continuously moving elongated metallic conductor, means 66 for changing the depth of cut of grooving means 64 such as the depth indexer shown, and support means 68, such as the back-up anvil shown, for supporting the continuously moving elongated metallic conductor. Grooving means 64 could also be a laser cutter, stamping apparatus or any other means for forming a groove on the continuously moving elongated metallic conductor. Support means 68 could also be a horizontal support surface, series of parallel rollers, or any other means for supporting the continuously moving elongated metallic conductor while it is being grooved. Grooving apparatus 60 includes means for varying the frequency of operation of grooving means 64 such as drive belt 70 and drive motor 72 in combination with a motor speed control such as is shown generally at 74. By varying the frequency of operation, grooving means 64 can be controlled to form the grooves at a predetermined spacing into the surface of a continuously moving elongated metallic conductor such as conductor 50.

Figure 7A:
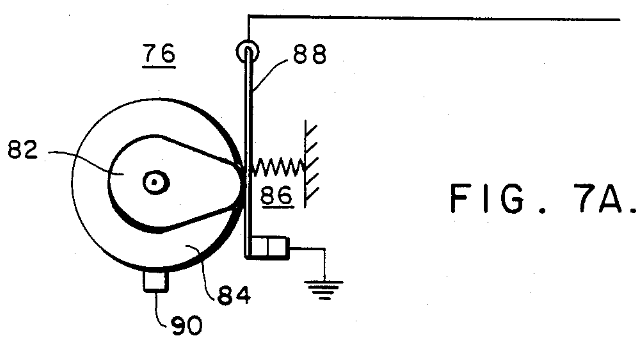
FIG. 7A is a plan view of a sensing means according to the teachings of the invention.

Grooving apparatus 60 also includes measuring means 76 for measuring the space between the grooves in the surface 52 of continuously moving elongated metallic conductor 50. Measuring means 76 includes sensing means 78, stroboscopic light 80 electrically connected and responsive to sensing means 78, and spacing scale 82. Stroboscopic light 80 is disposed on frame 62 on one side of and above the moving conductor and spacing scale 82 is disposed on the other side. Sensing means 78 senses the forming of each groove by grooving means 64 and may consist of a magnetic, electrical, or mechanical sensing device or any other arrangement for sensing the forming of each groove by grooving means 64. One arrangement for sensing means 78 is shown schematically in FIG. 7A wherein an eccentric cam 83 is fixedly mounted for rotation with router cutter head 84. A set of mechanical contact points 86 are mounted such that contact point lever arm 88 is spring biased towards eccentric cam 83 for momentary contact with eccentric cam 83. Upon rotation of eccentric cam 83 with router cutter head 84, mechanical contact points 86 open and close with every revolution of router cutter head 84 thereby momentarily completing the electrical power circuit for stroboscopic light 78 causing stroboscopic light 78 to flash and momentarily illuminate spacing scale 80 and a predetermined portion of newly-grooved continuously moving elongated conductor 50 when sensing means 76 senses the forming of each groove. A momentary stationary image of the moving conductor 50 is produced at the location of spacing scale 80, thereby enabling an operator to compare the spacing between the grooves with the spacing scale and adjust the frequency of operation of grooving means 64 to cause grooving means 64 to form grooves at a predetermined spacing into the surface 52 of moving elongated conductor 50.

Figure 7B:
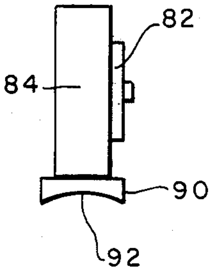
FIG. 7B is a side view of a concave surfaced cutting bit for use in the apparatus of FIG. 7A.

In order to cause the grooves 48 of surface 52 of conductor 50 (see FIGS. 3 and 4) to have the hourglass funnel shape discussed above, router cutter head 84 includes a concave surfaced cutting bit 90 as shown in FIG. 7B. The ends of concave surface 92 of cutting bit 90 contact the ends of surface 52 of continuously moving conductor 50 earlier and later as well as cut deeper than the middle of concave surface 92 of cutting bit 90 thereby forming hourglass funnel-shaped grooves such as grooves 48.

Referring again now to FIG. 7, in operation the continuously moving elongated conductor, such as conductor 50 is moved past and between the grooving means 64 and the support means 68 to cause grooves to be formed in the surface, such as surface 52, of a continuously moving elongated conductor, such as conductor 50. Sensing means 78 senses the forming of each groove and completes the electric power circuit for stroboscopic light 80 thereby flashing stroboscopic light synchronously with the sensing of the forming of each groove to momentarily illuminate the spacing scale 82 and a predetermined portion 94 of the newly grooved continuously moving elongated conductor 50 to obtain a momentary stationary image of the predetermined portion 94 of newly grooved conductor 50. An operator may then measure the distance between grooves by comparing the spacing of the grooves on the momentary image with the desired spacing on spacing scale 82 and varying the frequency of operation of grooving means 64 such as by varying the angular velocity of router cutter head 84 (see FIG. 7A) by adjusting the speed of motor 72 to cause the grooves to be formed in the surface 52 of the moving conductor 50 at the desired spacing.

After forming the grooves at a predetermined spacing in the surface 52, conductor 50 is then passed through an electrostatic powder coating means shown generally at 110 and means for heating the conductor 50 to a predetermined temperature shown generally at 112 to provide a uniform homogeneous coating of solid insulation. Apparatus and the manner of electrostatic powder coating the periphery of a continuously moving elongated conductor with a rectangular cross-sectional configuration such as conductor 50 with a uniform layer of solid heat-fused, cured solventless finely divided resinous polymeric powder is disclosed in U.S. Pat. No. 4,051,809 assigned to the same assignee as the present application. Basically a uniform layer of heat fused, solventless, finally divided resinous polymeric powder such as the epoxy resin powder formulation disclosed in co-pending application Ser. No. 661,070, filed Feb. 25, 1976, which is assigned to the same assignee as the present invention is electrostatically powder coated on the periphery of grooved conductor 50 by electrostatic powder coating means 110 and the uniformly coated grooved conductor 50 is heated to a predetermined temperature in heating means 112. For the epoxy resin formulation disclosed in the hereinbefore mentioned co-pending application, a temperature of approximately 500° C. is suitable to fuse the powdered particles of insulation into a uniform, homogeneous coating of solid insulation. The grooved conductor 50 so insulated is characterized by its uniform homogeneous coating of insulation, i.e., the insulation thickness in the grooves is the same as the insulation thickness on the balance of the periphery of the conductor 50.

Figure 8:
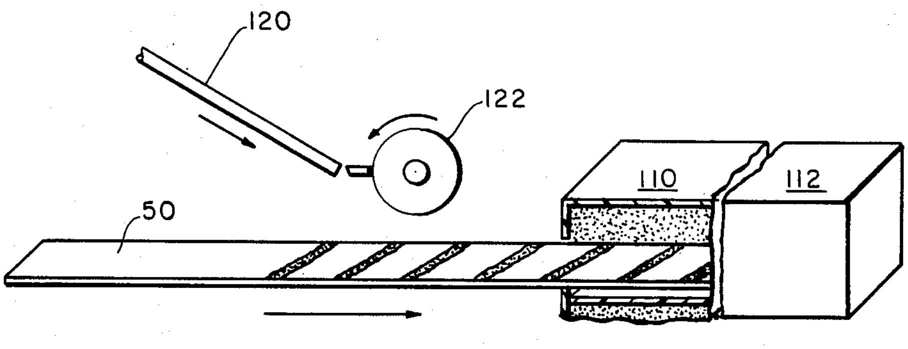
FIG. 8 is a digrammatic view in elevation of apparatus for producing bosses in a solid coating of uniform insulation according to the teachings of the invention.

The second method employed to produce the irregularities in a surface of an elongated conductor such as conductor 50 having a uniform covering of a solid homogeneous coating of the electrical insulation hereinbefore described was to provide bosses or protuberances in the insulating material itself at a predetermined spacing. Apparatus for doing this is shown in FIG. 8 wherein a stick of compressed insulation powder 120 is continuously fed into means for shearing small pieces of compressed insulation 122 and dropping the pieces along the surface 52 of continuously moving elongated conductor 50 and then passing conductor 50 through an electrostatic powder coater and heater as described above. In this manner, the small pieces of compressed powdered insulation and the uniform coating of powdered particles of the same insulating powder fuse into a uniform homogeneous coating of solid insulation having bosses or protuberances of the insulating material at predetermined spaces in order to provide irregularities in the surface of the insulated conductor.

In conclusion, the invention discloses an improved vapor-cooled electrical induction apparatus having a winding formed with an elongated metallic conductor having surface irregularities to provide spaces between certain adjacent portions of the turn surfaces to permit a vaporizable dielectric liquid to flow through the winding. Although the invention was developed in order to solve problems relative to the transformer industry, it will be appreciated that the invention is not limited to transform applications but rather is applicable to any vapor cooled inductive apparatus wherein the uniform finish of a powder coated insulated conductor is desired to be combined with surface irregularities in the insulated turn surfaces of induction windings to provide spaces to permit a vaporizable liquid dielectric to flow through the windings.

We claim:

1. Apparatus for forming precisely spaced grooves in the surface of a continuously moving, elongated, metallic conductor, comprising:

a frame;

grooving means for grooving said surface of said continuously moving, elongated, metallic conductor mounted on said frame;

support means for supporting said continuously moving, elongated, metallic conductor mounted on said frame opposite said grooving means and in close proximity thereto to support said moving elongated metallic conductor beneath said grooving means;

means moving the elongated metallic conductor between and past said grooving means and said support means;

means for varying the frequency of operation of said grooving means to cause said grooving means to form grooves at a predetermined spacing into said surface of said continuously moving elongated metallic conductor;

measuring means for measuring the space between the grooves in said surface of said continuously moving, elongated metallic conductor;

the measuring means including sensing means for sensing the forming of each groove;

a stroboscopic light mounted on the frame so as to illuminate a predetermined portion of the surface of the continuously moving elongated metallic conductor when said stroboscopic light flashes; and a spacing scale mounted on the frame to cause said spacing scale to be illuminated concurrently with said predetermined portion of the surface of the continuously moving, elongated metallic conductor when said stroboscopic light flashes, and said stroboscopic light being electrically connected and responsive to said sensing means to cause said stroboscopic light to flash and momentarily illuminate said spacing scale and said predetermined portion of the surface of the continuously moving, elongated, metallic conductor, when said sensing means senses the forming of each groove, to obtain a momentary stationary image of said predetermined portion of the surface of the continuously moving, elongated, metallic conductor, opposite said spacing scale to permit measurement of the space between the grooves in the surface of the continuously moving, elongated metallic conductor.

2. The apparatus of claim 1 wherein:

the grooving means includes a router cutter head rotatably mounted on the frame;

the support means includes a backup anvil rotatably mounted on the frame opposite said router cutter head and in close proximity thereto to support the continuously moving elongated, metallic conductor beneath said router cutter head;

the means for varying the frequency of operation of the grooving means includes means for rotating said router cutter head at a predetermined angular velocity and means for varying the angular velocity of said rotating router cutter head to cause said router cutter head to cut grooves at a predetermined spacing into the surface of said continuously moving, elongated, metallic conductor; and the sensing means includes an eccentric cam mounted for rotation with said router cutter head, and a set of mechanical contact points having a contact point lever arm, said contact point lever arm being spring biased towards said eccentric cam, said eccentric cam causing said contact points to open and close upon rotation of said eccentric cam with said router cutter head.

3. The apparatus of claim 2 wherein the router cutter head includes a concave surfaced cutting bit to cause the router cutter head to cut hourglass funnel-shaped grooves into the surface of the continuously moving, elongated, metallic conductor.

4. A method for grooving an elongated continuously moving, metallic conductor, comprising:

moving the conductor longitudinally past a rotating router head to cause grooves to be cut into the surface of said moving conductor, sensing the cutting of each groove, synchronizing a stroboscopic light to flash when the cutting of each groove is sensed, flashing said synchronized stroboscopic light on said moving grooved conductor when the cutting of each groove is sensed to momentarily illuminate a predetermined portion of said moving grooved conductor to obtain a momentary stationary image of said predetermined portion of said moving grooved conductor, measuring the space between the grooves on the momentary stationary image of said predetermined portion of said moving grooved conductor, varying the angular velocity of the rotating router head to cause the router head to cut the grooves into said moving conductor at a predetermined spacing.

* * * * *